Patented May 21, 1929.

1,713,822

UNITED STATES PATENT OFFICE.

ARTHUR W. DOX, OF WINDSOR, ONTARIO, CANADA, ASSIGNOR TO PARKE, DAVIS & COMPANY, OF DETROIT, MICHIGAN, A CORPORATION OF MICHIGAN.

NORMAL AMYL CHLOROMALONAMIDE.

No Drawing.  Application filed May 28, 1928.  Serial No. 281,370.

The invention relates to a new composition of matter useful particularly for its powerful sweetening properties. The new substance may be designated as normal-amyl-chloromalonamide and possesses the following structure

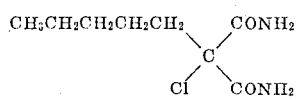

Unlike the hitherto used synthetic sweetening agents, such as saccharin and dulcin, this substance is a strictly aliphatic derivative and can in no sense whatever be regarded as a coal tar product. It was synthesized as is illustrated by the following example:

The synthesis is carried out in three steps, each of which results in the formation of a hitherto unknown substance. In the first step of the process, 23 parts by weight of metallic sodium are dissolved in 400 parts of absolute alcohol, 160 parts of ethyl malonate are added, then 151 parts of normal amyl bromide, or an equivalent amount of normal amyl chloride, are slowly added and the mixture refluxed over a steam bath for two hours, the mixture being stirred continuously during the entire operation. When the reaction is complete, as indicated by a copious separation of sodium bromide, or chloride, and neutrality to litmus, the greater part of the alcohol is distilled off and the residue treated with water. The oily layer which separates is the heretofore unknown intermediate, ethyl normal amyl malonate, which after purification by vacuum distillation boils at 134–136° at 14 mm.

In the second step of the process the above described ethyl normal amyl malonate is shaken for several days with 5 to 10 volumes of concentrated aqueous ammonia. The crystals which form consist of the hitherto unknown intermediate, normal amyl malonamide, which after recrystalization from dilute alcohol, shows a melting point of 206° C.

The third step consists in dissolving the above mentioned normal amyl malonamide in glacial acetic acid or some other suitable solvent and passing in a slow current of chlorine gas until the solvent has taken on a yellow color. The solvent is then removed by vacuum distillation and the residue treated with water. The white crystals which separate consist of the final product, the heretofore unknown normal amyl chloromalonamide, which after washing with water and purification by recrystallization from dilute alcohol, show a melting point of 134–5°. A 0.005% aqueous solution of this substance exhibits the same degree of sweetness as a 2% solution of cane sugar. On this basis of comparison, my new product possesses 400 times the sweetening power of cane sugar.

The chemical reactions involved in the 3 steps of the process above outlined may be represented by the following equations:

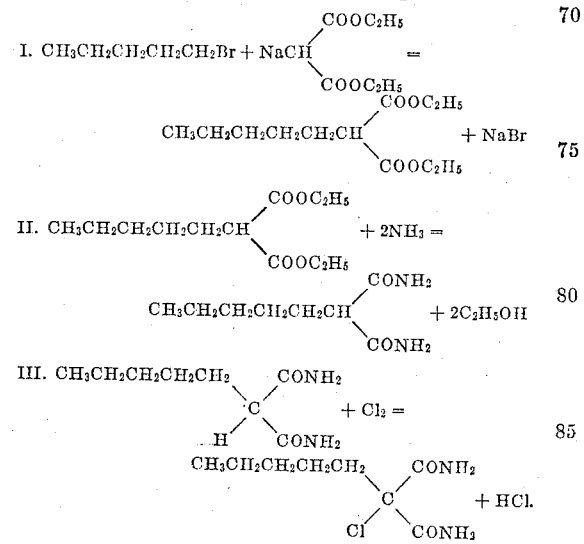

What I claim as my invention is:

As a new composition of matter, normal amyl chloromalonamide, a white chrystalline substance melting at 134° to 135° C., having the structure

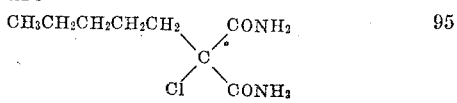

and exhibiting powerful sweetening properties.

In testimony whereof I affix my signature.

ARTHUR W. DOX.